United States Patent
Chen

[19]

[11] Patent Number: 5,963,014
[45] Date of Patent: Oct. 5, 1999

[54] SERIALLY CONNECTED CHARGER

[75] Inventor: Tonny Chen, Chang-Hua, Taiwan

[73] Assignee: E. Lead Electronic Co., Ltd., Chang-Hua, Taiwan

[21] Appl. No.: 09/115,612

[22] Filed: Jul. 15, 1998

[51] Int. Cl.[6] ................................ H01M 10/46
[52] U.S. Cl. .................. 320/110; 320/113; 320/116; 320/119
[58] Field of Search ................... 320/110, 113, 320/115, 116, 119, 123; D13/104, 107; 429/149, 153, 157, 170

[56]          References Cited

U.S. PATENT DOCUMENTS

| | | | |
|---|---|---|---|
| 3,696,283 | 10/1972 | Ackley, III | 320/110 |
| 4,591,777 | 5/1986 | McCarty et al. | 320/110 |
| 4,672,292 | 6/1987 | Hernandez | 320/113 X |
| 5,814,968 | 9/1998 | Lovegreen et al. | 320/113 |

*Primary Examiner*—Edward H. Tso
*Attorney, Agent, or Firm*—Rosenberger, Klein & Bilker

[57]          ABSTRACT

A plurality of chargers can be serially connected for charging a plurality of rechargeable batteries synchronously. Each of the serially connected chargers includes an upper cap having a hollow receiving base and a charging terminal mounted in the hollow receiving base, a base mounted on the upper cap and having first side wall and a second side wall, an AC power input plug mounted on the first side wall of the base, an AC power output receptacle mounted on the second side wall of the base, a charging device that includes transformer and circuit board mounted in the base, a pair of first conducting wires each having a first side connected to the power supply input plug and a second side connected to the transformer, a pair of second conducting wires each having a first side connected to the circuit board and a second side connected to the charging terminal, and a pair of third conducting wires each having a first side connected to the AC power input plug and a second side connected to the AC power output receptacle.

3 Claims, 6 Drawing Sheets

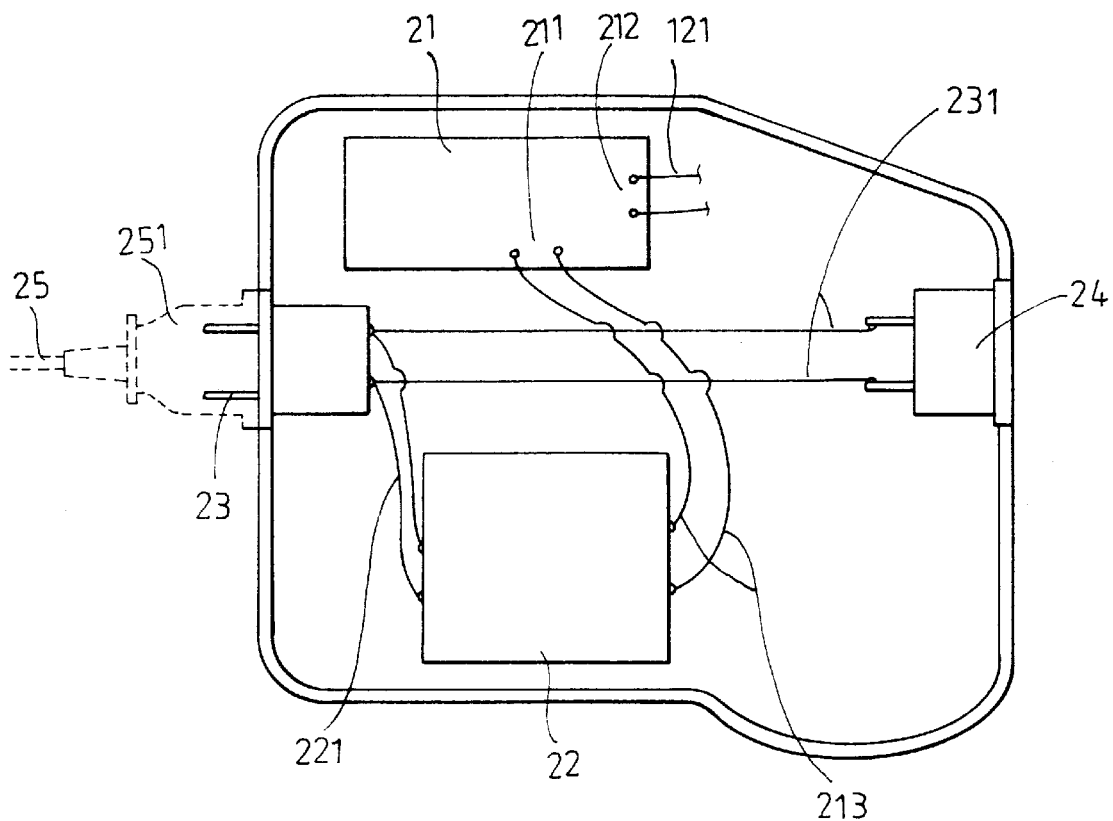
F I G. 3 a serially connected charger.

BACKGROUND OF THE INVENTION

1. Field of the Invention

The present invention relates to a serially connected charger.

2. Description of the Related Prior Art

A conventional charger can be used to charge such as a rechargeable battery. However, the conventional charger can be used for charging one rechargeable battery only at a time and cannot be used to charge a plurality of rechargeable batteries synchronously, thereby causing time consumption and easily incurring an inconvenience in use. The present invention has arisen to overcome the disadvantage of the conventional charger.

SUMMARY OF THE INVENTION

The primary objective of the present invention is to provide a serially connected charger which can be used to charge such as a plurality of rechargeable batteries synchronously, thereby saving time for charging the rechargeable batteries.

According to one aspect of the present invention, there is provided a serially connected charger comprising an upper cap having a hollow receiving base and a charging terminal mounted in the hollow receiving base, a base mounted on the upper cap and having first side wall and a second side wall, an AC power input plug mounted on the first side wall of the base, an AC power output receptacle mounted on the second side wall of the base, a charging device that includes transformer and circuit board mounted in the base, a pair of first conducting wires each having a first side connected to the AC power input plug and a second side connected to the transformer, a pair of second conducting wires each having a first side connected to the circuit board and a second side connected to the charging terminal, and a pair of third conducting wires each having a first side connected to the AC power input plug and a second side connected to the AC power output receptacle.

According to another aspect of the present invention, the first side wall of the base is formed with a positioning extension located under the AC power input plug and defining a threaded bore, and the second side wall of the base defines a recess located under the AC power output receptacle and defines a retaining hole, whereby the positioning extension of a first charger can be received into the recess of a second charger with the threaded bore aligning with the retaining hole, and a positioning screw extending through the threaded bore and the retaining hole.

According to a further aspect of the present invention, the first side wall of the base is formed with a positioning extension located under the AC power input plug and having two sides each formed with a locking boss, and the second side wall of the base defines a recess located under the AC power output receptacle and having two sides each defining a retaining cavity, whereby the positioning extension of a first charger can be received into the recess of a second charger with the locking boss of each of the two sides of the positioning extension being snapped into the retaining cavity of each of the two sides of the recess.

Further objectives and advantages of the present invention will become apparent after a careful reading of the detailed description with appropriate reference to the accompanying drawings.

BRIEF DESCRIPTION OF THE DRAWINGS

FIG. 3 is a top plan view of the charger with an upper cap being removed;

DETAILED DESCRIPTION OF THE PREFERRED EMBODIMENTS

Figure 1:
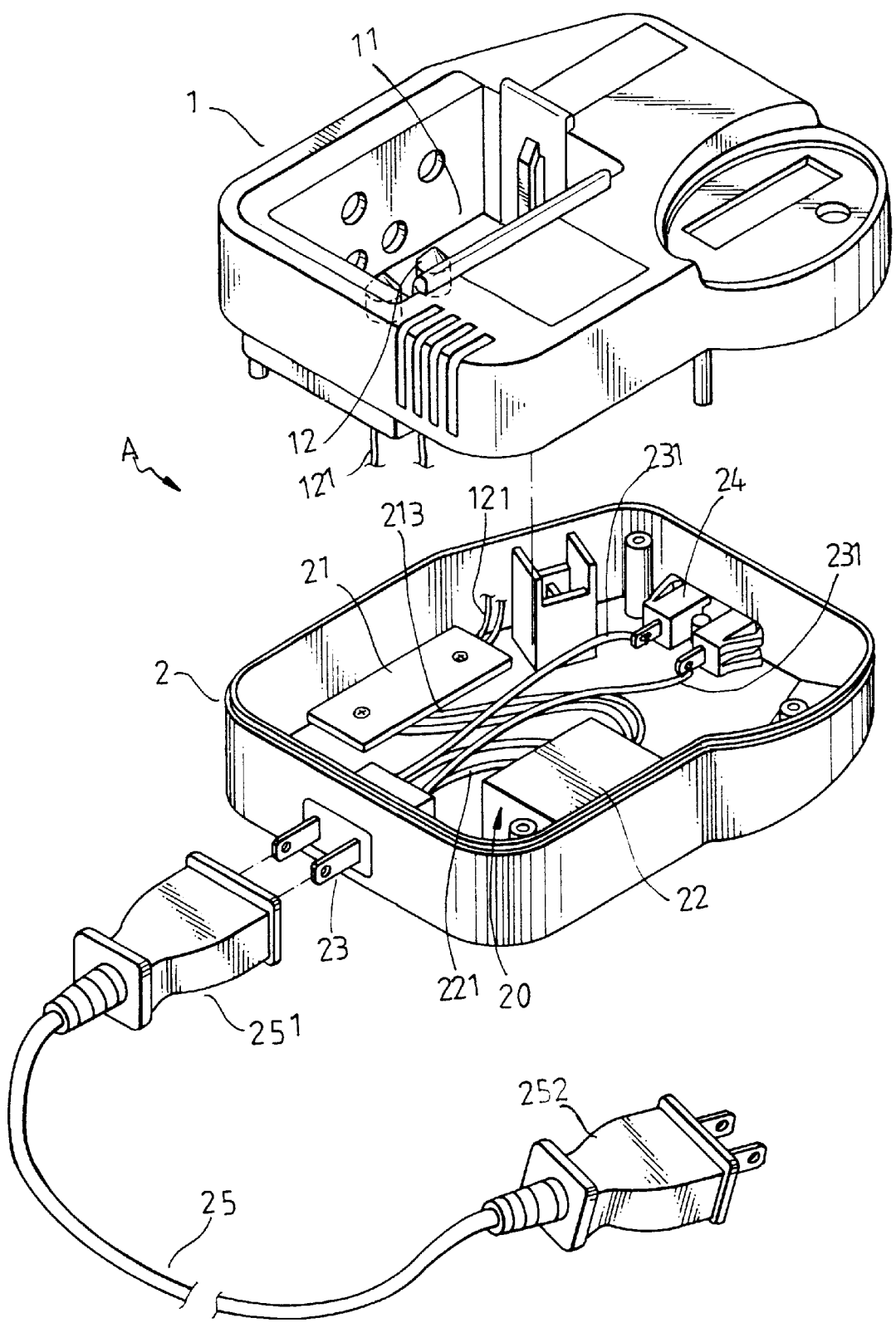
FIG. 1 is an exploded view of a serially connected charger according to the present invention.

Referring to FIGS. 1–4, a serially connected charger A according to the present invention comprises an upper cap 1 having a hollow receiving base 11 for receiving such as a rechargeable battery T1 of a cordless telephone set T (see FIG. 4) and a charging terminal 12 mounted in the hollow receiving base 11, a base 2 mounted on the upper cap 1 and having first side wall and a second side wall, an AC power input plug 23 mounted on the first side wall of the base 2, an AC power output receptacle 24 mounted on the second side wall of the base 2, a charging device 20 that includes transformer 22 and circuit board 21 mounted in the base 2, a pair of first conducting wires 221 each having a first side connected to the AC power input plug 23 and a second side connected to the transformer 22, a pair of second conducting wires 121 each having a first side connected to a circuit board 21 and a second side connected to the charging terminal 12, and a pair of third conducting wires 231 each having a first side connected to the AC power input plug 23 and a second side connected to the AC power output receptacle 24.

The charging device 20 includes a transformer 22 connected to the AC power input plug 23 via the first conducting wires 221, and a circuit board 21 having an input side 211 connected to the transformer 22 via a pair of conducting wires 213 and an output side 212 connected to the charging terminal 12 via the second conducting wires 121.

An AC power conducting wire 25 includes a first side formed with a receptacle 251 into which the AC power input plug 23 can be inserted and a second side formed with a plug 252 which can be inserted into an AC power receptacle (not shown) for supplying electricity to the charger A.

Figure 2:
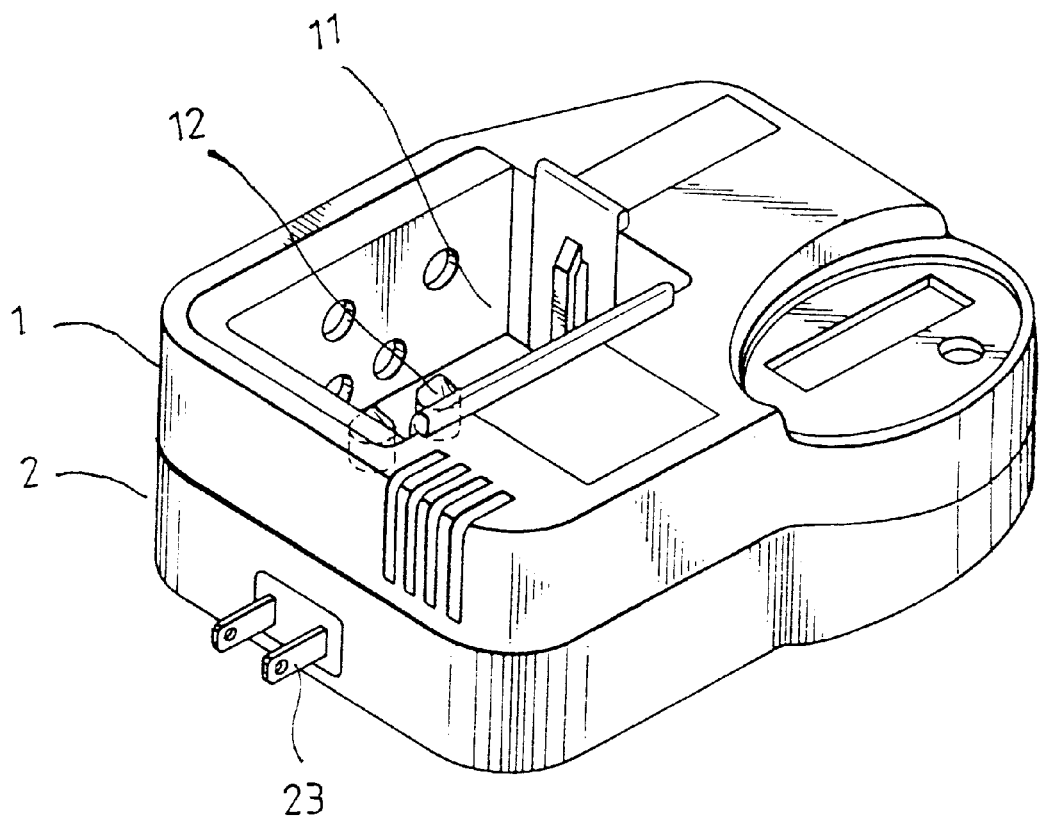
FIG. 2 is a perspective assembling view of the charger shown in FIG. 1.
Figure 4:
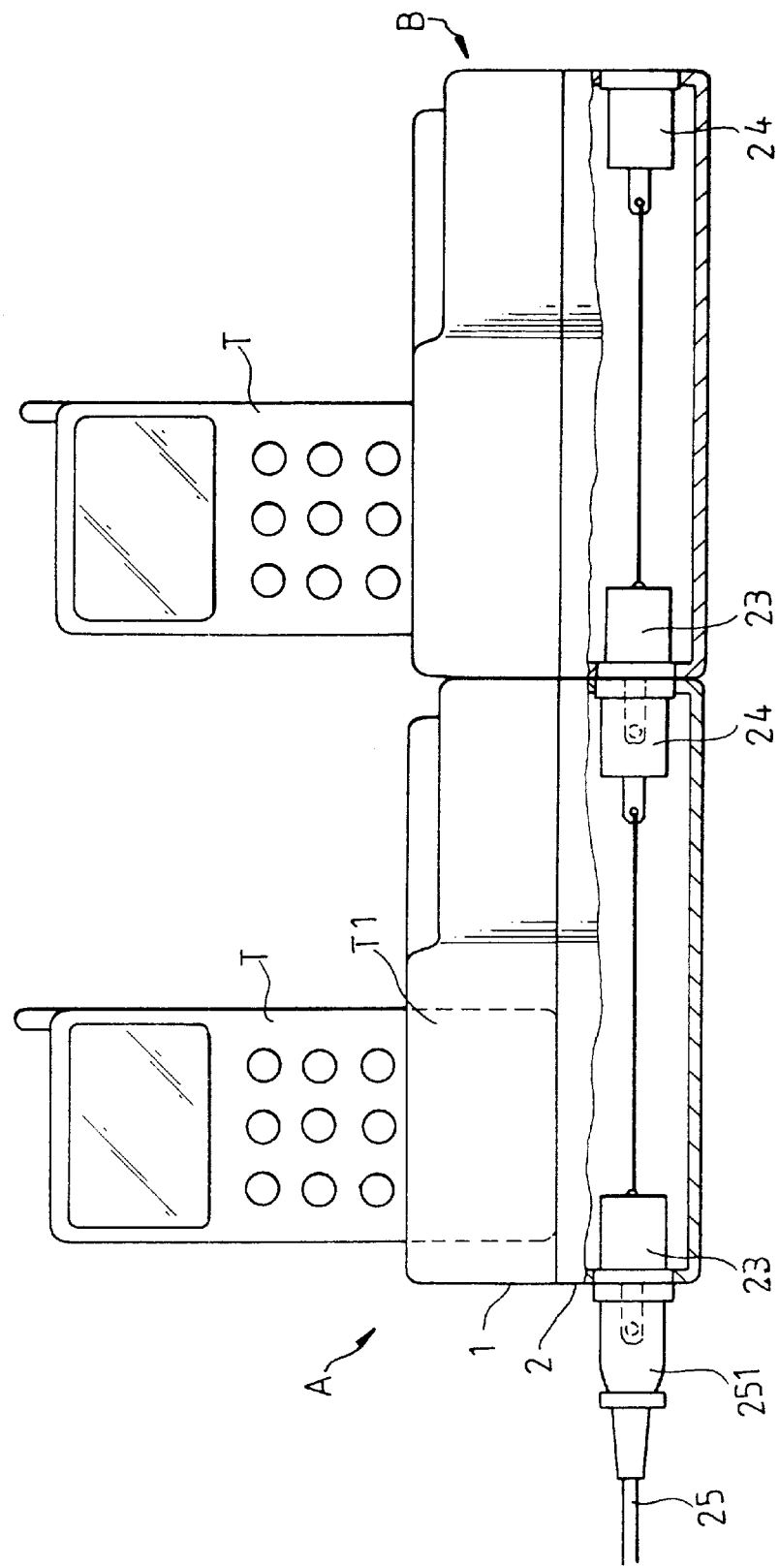
FIG. 4 is a front plan view showing two chargers being serially connected.

In operation, referring to FIG. 4 with reference to FIGS. 1–3, the rechargeable battery T1 of the cordless telephone set T can be inserted into the receiving base 11 of the upper cap 1 of the first charger A to be in contact with the charging terminal 12. The current supplied from the receptacle 251 of the AC power conducting wire 25 into the AC power input plug 23 of the base 2 of the first charger A can be introduced into the transformer 22 of the charging device 20 via the conducting wires 221, then flow into the circuit board 21 via the conducting wires 213 and can finally flow into the charging terminal 12 via the conducting wires 121 for charging the rechargeable battery T1 of the cordless telephone set T.

The current supplied from the receptacle 251 of the AC power conducting wire 25 into the AC power input plug 23 of the base 2 of the first charger A can also be introduced into the AC power output receptacle 24 via the conducting wires 231. The rechargeable battery T1 of another cordless telephone set T can then be inserted into the receiving base 11 of the upper cap 1 of a second charger B which is serially connected to the first charger A with its AC power input plug 23 being inserted into the power supply output receptacle 24 of the first charger A such that the current can to be introduced from the first charger A into the second charger B for charging the rechargeable battery T1 of another cordless telephone set T. In such a manner, a plurality of chargers can be serially connected with each other for charging a plurality of rechargeable batteries T1 synchronously, thereby greatly saving time for charging the plurality of rechargeable batteries T1.

Figure 5:
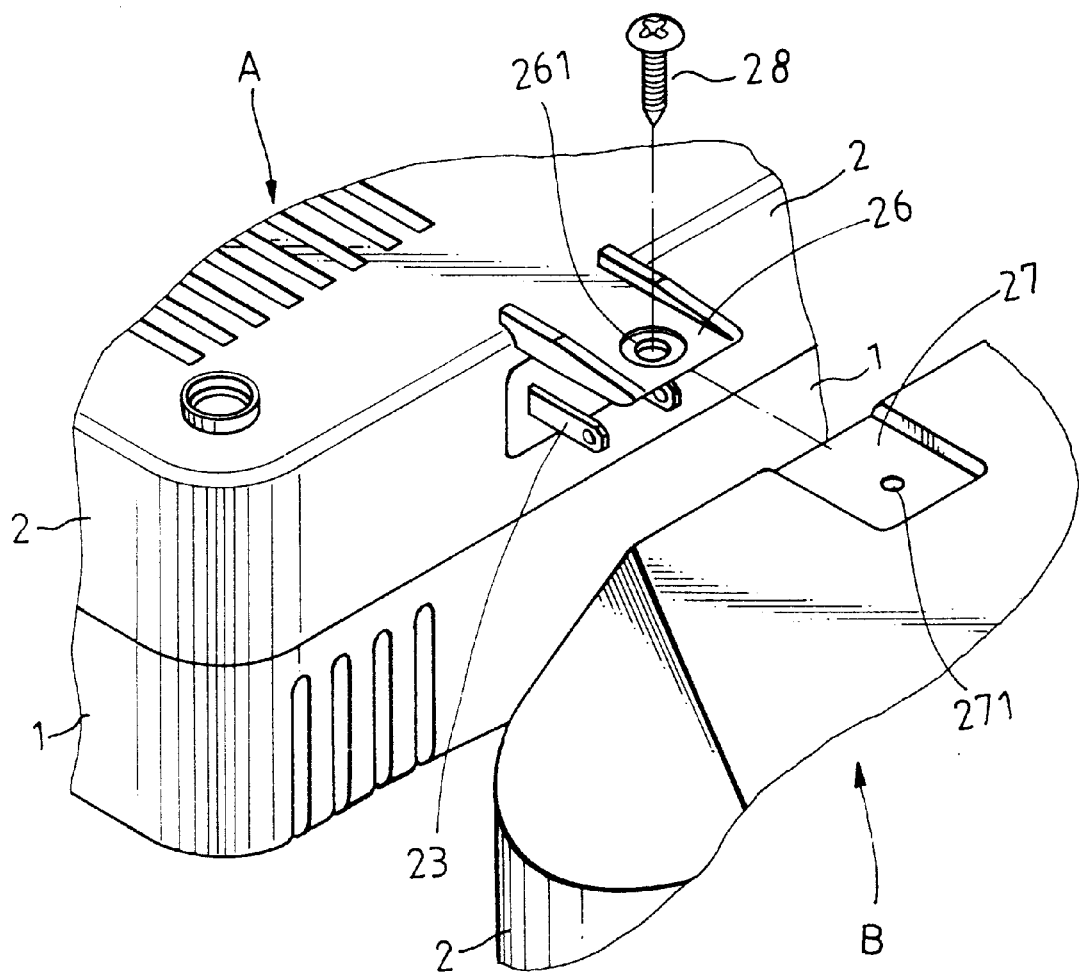
FIG. 5 is a partially cut-away bottom perspective view according to another embodiment of the present invention, showing two chargers to be combined.

Referring to FIG. 5 with reference to FIGS. 1–3, according to another embodiment of the present invention, the first side wall of the base 2 is formed with a positioning extension 26 located under the AC power input plug 23 and defining a threaded bore 261, and the second side wall of the base 2 defines a recess 27 located under the power supply output receptacle 24 and defines a retaining hole 271, whereby the positioning extension 26 of the first charger A can be received into the recess 27 of the second charger B with the threaded bore 261 aligning with the retaining hole 271, and a positioning screw 28 can extend through the threaded bore 261 and the retaining hole 271, thereby coupling the first charger A and the second charger B together.

Figure 6:
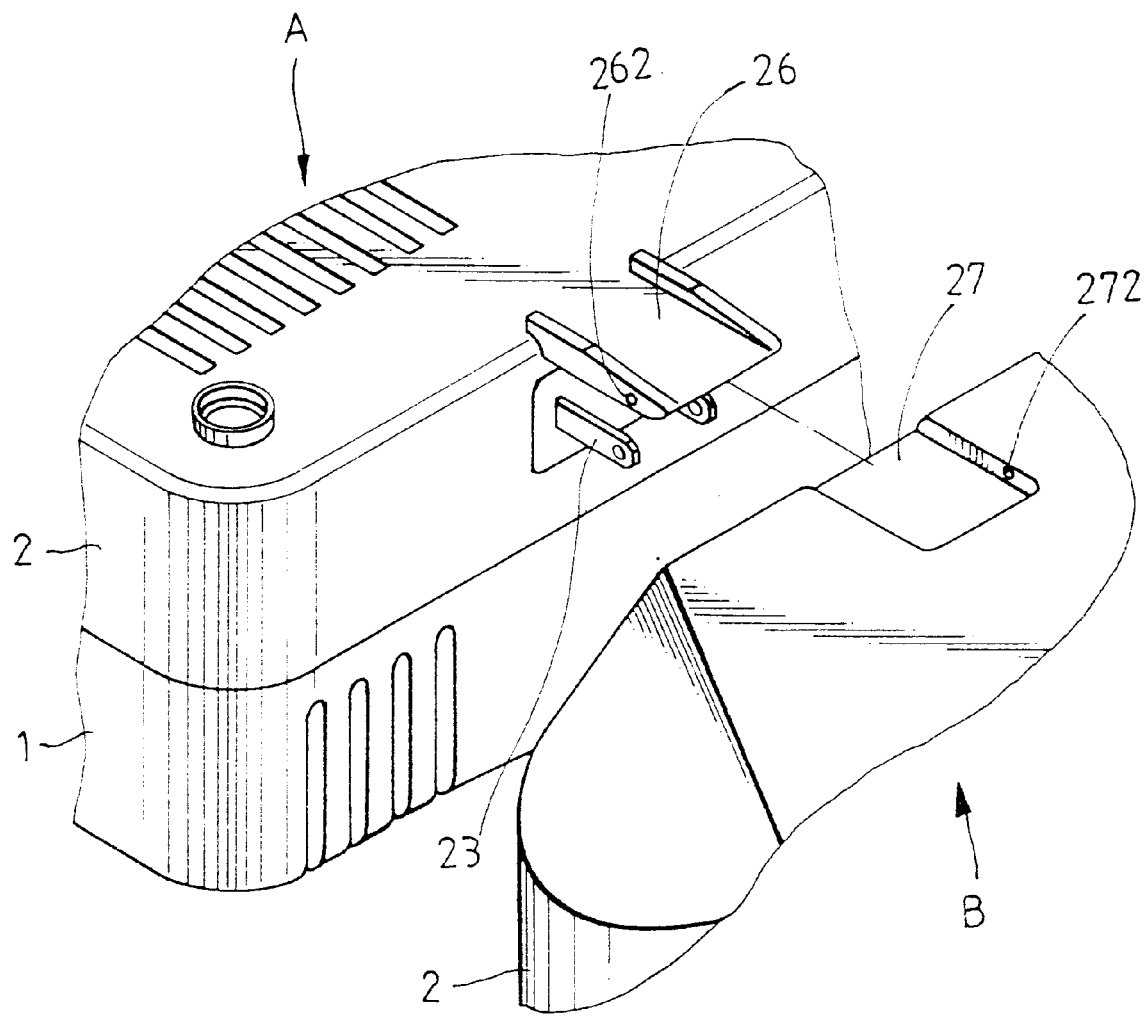
FIG. 6 is a partially cut-away bottom perspective view according to a further embodiment of the present invention, showing two chargers to be combined.

Referring to FIG. 6 with reference to FIGS. 1–3, according to a further embodiment of the present invention, the first side wall of the base 2 is formed with a positioning extension 26 located under the AC power input plug 23 and having two sides each formed with a locking boss 262, and the second side wall of the base 2 defines a recess 27 located under the AC power output receptacle 24 and having two sides each defining a retaining cavity 272, whereby the positioning extension 26 of the first charger A can be received into the recess 27 of the second charger B with the locking boss 262 of each of the two sides of the positioning extension 26 being snapped into the retaining cavity 272 of each of the two sides of the recess 27, thereby coupling the first charger A and the second charger B together.

Accordingly, the serially connected charger according to the present invention has the following advantages:

1. A plurality of chargers can be connected in series for charging a plurality of rechargeable batteries synchronously without a necessity for having to provide a plurality of AC power receptacles.
2. The plurality of chargers are used for charging a plurality of rechargeable batteries synchronously by means of an electricity sharing manner, thereby greatly saving time for charging the rechargeable batteries.

Although the present invention has been described with a certain degree of particularity, it is to be understood that the present disclose has been made by way of example only and that many other possible modifications and variations can be made without departing from the scope and spirit of the present invention.

I claim:

1. A serially connected charger comprising:
   an upper cap having a hollow receiving base and an charging terminal mounted in the hollow receiving base;
   a base mounted on the upper cap and having first side wall and a second side wall;
   an AC power input plug mounted on the first side wall of the base;
   an AC power output receptacle mounted on the second side wall of the base;
   a charging device that includes transformer and circuit board mounted in the base;
   a pair of first conducting wires each having a first side connected to the AC power input plug and a second side connected to the transformer;
   a pair of second conducting wires each having a first side connected to the AC power and a second side connected to the charging terminal; and
   a pair of third conducting wires each having a first side connected to the AC power input plug and a second side connected to the AC power output receptacle.

2. The serially connected charger as claimed in claim 1, wherein the first side wall of the base is formed with a positioning extension located under the AC power input plug and defining a threaded bore, and the second side wall of the base defines a recess located under the AC power output receptacle and defines a retaining hole, whereby the positioning extension of a first charger can be received into the recess of a second charger with the threaded bore aligning with the retaining hole, and a positioning screw extending through the threaded bore and the retaining hole.

3. The serially connected charger as claimed in claim 1, wherein the first side wall of the base is formed with a positioning extension located under the AC power supply input plug and having two sides each formed with a locking boss, and the second side wall of the base defines a recess located under the AC power output receptacle and having two sides each defining a retaining cavity, whereby the positioning extension of a first charger can be received into the recess of a second charger with the locking boss of each of the two sides of the positioning extension being snapped into the retaining cavity of each of the two sides of the recess.

\* \* \* \* \*